US011478737B2

(12) United States Patent
Poulsen

(10) Patent No.: US 11,478,737 B2
(45) Date of Patent: Oct. 25, 2022

(54) METHOD AND APPARATUS FOR PROVIDING TEST PORTS

(71) Applicant: American Air Filter Company, Inc., Louisville, KY (US)

(72) Inventor: Jorn Poulsen, Kuala Lumpur (MY)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 0 days.

(21) Appl. No.: 16/014,470

(22) Filed: Jun. 21, 2018

(65) Prior Publication Data

US 2019/0247779 A1    Aug. 15, 2019

Related U.S. Application Data

(63) Continuation-in-part of application No. 15/893,403, filed on Feb. 9, 2018, now abandoned.

(51) Int. Cl.

| | | |
|---|---|---|
| *B01D 46/00* | (2022.01) | |
| *B01D 46/10* | (2006.01) | |
| *B01D 46/52* | (2006.01) | |
| *B01D 46/88* | (2022.01) | |
| *B01D 46/62* | (2022.01) | |
| *B01D 53/22* | (2006.01) | |
| *F24F 13/28* | (2006.01) | |

(52) U.S. Cl.
CPC ..... *B01D 46/0005* (2013.01); *B01D 46/0013* (2013.01); *B01D 46/10* (2013.01); *B01D 46/521* (2013.01); *B01D 46/645* (2022.01); *B01D 46/88* (2022.01); *B01D 2053/221* (2013.01); *B01D 2273/18* (2013.01); *B01D 2279/51* (2013.01); *F24F 13/28* (2013.01)

(58) Field of Classification Search
CPC .......................... B01D 46/00; B01D 46/2459; B01D 46/0005; B01D 46/0013; B01D 46/008; B01D 46/10; B01D 2053/221; F24F 13/28
USPC ...................................... 55/495–511; 95/1–24
See application file for complete search history.

(56) References Cited

U.S. PATENT DOCUMENTS

| | | |
|---|---|---|
| 3,395,514 A | 8/1968 | Bub |
| 4,646,558 A | 3/1987 | Gualtieri |

(Continued)

FOREIGN PATENT DOCUMENTS

| | | |
|---|---|---|
| CN | 1568217 A | 1/2005 |
| CN | 101297187 A | 10/2008 |

(Continued)

OTHER PUBLICATIONS

International Search Report and Written Opinion of PCT Ser. No. PCT/US2019/016835 dated May 15, 2019.

(Continued)

*Primary Examiner* — T. Bennett McKenzie
(74) *Attorney, Agent, or Firm* — Middleton Reutlinger

(57) ABSTRACT

A filter apparatus and method having a test port member in combination with a filter media. The test port member may be positioned adjacent the outer periphery of the outer peripheral frame and may be attached to a truncated portion of the filter media. One or more scrim layers may be disposed across one or more sides of the test port member and/or the truncated portion of the filter media. A plug may be inserted into a through port of the test port member.

11 Claims, 14 Drawing Sheets

(56) References Cited

U.S. PATENT DOCUMENTS

| | | | | |
|---|---|---|---|---|
| 5,540,028 A | * | 7/1996 | Scott | B01D 46/0005 52/302.1 |
| 5,871,556 A | | 2/1999 | Jeanseau | |
| 6,126,707 A | * | 10/2000 | Pitzen | B01D 46/0005 428/122 |
| 6,267,793 B1 | | 7/2001 | Gomez | |
| 10,345,215 B1 | * | 7/2019 | Pedalino | G01N 15/0806 |
| 2002/0166811 A1 | * | 11/2002 | Walker | B01D 46/0024 210/455 |
| 2005/0217226 A1 | | 10/2005 | Sundet et al. | |
| 2006/0112757 A1 | * | 6/2006 | Morse | B01D 46/0086 73/38 |
| 2007/0028777 A1 | * | 2/2007 | Hoffman | B01D 53/261 96/143 |
| 2008/0009833 A1 | * | 1/2008 | Corbin | F16L 47/02 604/533 |
| 2009/0173233 A1 | * | 7/2009 | Ottesen | B01D 46/0005 29/896.62 |
| 2012/0031059 A1 | | 2/2012 | Haslebacher | |
| 2012/0144790 A1 | * | 6/2012 | Cambo | B01D 39/1692 55/486 |
| 2013/0000489 A1 | | 1/2013 | Lu | |

FOREIGN PATENT DOCUMENTS

| | | |
|---|---|---|
| CN | 101855000 A | 10/2010 |
| CN | 102725046 A | 10/2012 |
| CN | 103338833 A | 10/2013 |
| CN | 205032013 U | 2/2016 |
| CN | 106918428 A | 7/2017 |
| CN | 111818985 A | 10/2020 |
| DE | 202005015911 U1 | 12/2005 |
| EP | 3749433 A1 | 12/2020 |
| IN | 202047037914 A | 9/2020 |
| JP | H07265633 A | 10/1995 |

OTHER PUBLICATIONS

U.S. Patent Office; Office Action issued in U.S. Appl. No. 15/893,403 dated Jun. 16, 2020.

European Communication issued in European Application No. 19706176.5 dated Sep. 16, 2020.

European Communication issued in European Application No. 19706176.5, dated Jul. 19, 2021, 6 pages.

China National Intellectual Property Administration, Office Action issued in application No. 201980018141.7, dated Sep. 29, 2021.

China National Intellectual Property Administration; Notice of Grant issued in Application No. 201980018141.7, 6 pages, dated Apr. 7, 2022.

Government of India, Examination Report issued in Application No. 202047037914, 7 pages, dated Aug. 5, 2022.

European Patent Office; Communication pursuant to Article 94(3) issued in Application No. 19706176.5, 5 pages, dated Feb. 8, 2022.

* cited by examiner

METHOD AND APPARATUS FOR PROVIDING TEST PORTS

BACKGROUND

The present embodiments relate to a method and apparatus for a filter, with particular embodiments shown for a filter apparatus and method for use with test ports.

As shown in FIG. 1, in one typical type of clean room construction, an air filter 1 may be positioned in the ceiling of a room to include one or more air filtration or diffuser units. Each of these units may include a hood/housing 2 with a filter 1 positioned across the opening thereof adjacent the clean room surface. Air is forced into the unit and through the filter 1 and/or diffuser 3. The diffuser 3, if used, may be supported upstream of the filter 1 within the unit. The filter 1 may include a frame 4 having two adjacent filter media sections or packs 5a, 5b separated by a centerboard 6 with a test port 6a. If a diffuser 3 is used, the centerboard 6 may have a second port 6b to adjust the diffuser therethrough. As a result of the centerboard 6, the filter 1 requires two separate filter media/packs 5a, 5b and two separate scrim 7a, 7b increasing the cost to manufacture and/or additional assembly labor (e.g. additional centerboard material and adhesive applied to multiple filter packs). Moreover, the centerboard 6 may decrease the airflow uniformity across the filter 1 and may negatively impact the visual appearance of the filter 1 to blend into the rest of the ceiling or surrounding structure. Thus, there is a need for a filter apparatus and method to provide test ports allowing the user to, but is not limited to, reduce assembly labor, material cost, and material waste while increasing airflow uniformity and the visual appearance of the filter.

SUMMARY

In some embodiments of the invention, for example, a filter apparatus comprising a filter media having an outer periphery, wherein a front face and an a rear face is defined by the outer periphery. In some embodiments, the outer periphery of the filter media includes a truncated portion. In various embodiments, the filter apparatus includes a test port member having a through port extending between a front face and an opposing rear face. In some embodiments, the filter apparatus includes an outer peripheral frame receiving the filter media and the test port member thereby positioning the rear face of each the filter media and the test port member adjacent to each other and correspondingly positioning the front face of each the filter media and the test port member adjacent to each other. In some embodiments, the test port member is received between the outer peripheral frame and the outer periphery truncated portion of the filter media.

In various embodiments, the filter apparatus may include a scrim disposed across the test port member and the filter media. In some embodiments, the scrim includes an opening coaxial with the through port of the test port member. In addition, in some embodiments, the filter apparatus may include a plug received in the opening of the scrim and the through port of the test port member. In various embodiments, the rear face and the front face of the test port member is triangular in shape. In some embodiments, the outer peripheral frame defines an opening, wherein the filter media and the test port member is disposed across the opening. Moreover, in various embodiments, the outer peripheral frame may receive a single filter media.

In some embodiments, a filter apparatus may comprise a filter media having an outer periphery, wherein a front face and a rear face is defined by the outer periphery. In various embodiments, the filter apparatus may include a test port member having a through port extending between a front face and an opposing rear face, wherein the front face and the rear face of the test port member is defined by an outer periphery. In some embodiments, the filter apparatus may include an outer peripheral frame receiving the filter media and the test port member. Moreover, in various embodiments, the test port member may be attached to the outer peripheral frame and the outer periphery of the filter media. In some embodiments, a portion of the outer periphery of the test port member engages the outer periphery of the filter media and an entire remaining portion of the outer periphery of the test port member may be adjacent to the outer peripheral frame.

In various embodiments, the filter apparatus may comprise a scrim layer disposed across at least one of the front face of each the test port member and the filter media and the rear face of each the test port member and the filter media. In some embodiments, the scrim layer may be disposed across the rear face of the test port member and the rear face of the filter media. In addition, in some embodiments, the outer peripheral frame may include one or more frame members defining an opening therein. In some embodiments, the entire remaining portion of the outer periphery of the test port member may engage two nonparallel sides of the one or more frame members. In various embodiments, the filter media may include a truncated corner, wherein the truncated corner engages the portion of the outer periphery of the test port member. In some embodiments, the filter apparatus may comprise a plug received by the through port adjacent the rear face of the test port member. Moreover, in various embodiments, the outer peripheral frame may include one or more frame members defining an opening therein, wherein two adjacent sides of the one or more frame members create an inside corner of the outer peripheral frame. In some embodiments, the inside corner may engage the entire remaining portion of the test port member.

Other embodiments may include a method of manufacturing a filter apparatus comprising the steps of providing a U-shaped portion of an outer peripheral frame at least partially defining an through opening of the filter apparatus. In various embodiments, the method may include the U-shaped portion having a center frame member and a lateral frame member extending from each end of the center frame member. In some embodiments, the method may include providing a test port member having a through port. In addition, in some embodiments, the method may include attaching the test port member to one of the lateral frame members and the center frame member within the U-shaped portion. In various embodiments, the method may include providing a filter media. In some embodiments, the method may include removing a portion of the filter media thereby creating a truncated portion of the filter media. Moreover, in various embodiments, the method may include inserting the truncated portion of the filter media into the U-shaped portion. In some embodiments, the test port member fills the void left of the portion of the filter media removed. In various embodiments, the method may include assembling a remaining portion of the outer peripheral frame to the U-shaped portion.

In various embodiments, the method may include inserting a scrim on at least one of a rear face of each of the test port member and the truncated portion of the filter media and a front face of each of the test port member and the truncated portion of the filter media. In some embodiments, the scrim may be on the rear face of each of the rear face of each of the test port member and the truncated portion of the filter media. In some embodiments, the scrim may be on at least one of the rear face or front face of the truncated portion of the filter media. In some embodiments, the scrim may be on the front face of each of the rear face of each of the test port member and the truncated portion of the filter media. In some embodiments, the method may include inserting a plug into the through port of the test port member. In various embodiments, the test port member may be adhesively attached to each of the center frame member, the lateral frame member, and the truncated portion of the filter media.

In some embodiments of the invention, for example, a filter having a testing port may comprise a pleated v-shaped filter media having a front face and a rear face. In various embodiments, the pleats may extend to a predefined height. In addition, in some embodiments, the filter may have a test port member having a through port extending between a front face and an opposing rear face of the test port member, and an inwardly facing side extending between the front face and the opposing rear face. In various embodiments, the filter may have a peripheral frame receiving the filter media and the test port member and maintains them in adjacent relationships. In some embodiments, the test port member may be retained by the peripheral frame and may be positioned between the peripheral frame and a truncated portion of the pleated v-shaped filter media. Moreover, in various embodiments, the inwardly facing side of the test port member may engage an outer periphery of the filter media. In some embodiments, the test port member may define one or more cavities with the peripheral frame intersected by the through port. In various embodiments, both the pleated v-shaped filter media having the truncated portion and the test port member adjacent the truncated portion may be retained within the peripheral frame and forming a rectangular filter.

In various embodiments, an end wall of the test port member may be recessed from a downstream side of the peripheral frame. In some embodiments, the filter may comprise a plug, wherein at least a portion of the plug may be positioned between the end wall and the downstream side of the peripheral frame. Moreover, in some embodiments, the plug may be an aerosol plunger at rest in a closed position. In various embodiments, the end wall of the test port member may be recessed from an upstream side of the peripheral frame. In some embodiments, the test port member further comprises one or more fill members within the one or more cavities defining at least a portion of the through port. In addition, in various embodiments, each of the front face and the rear face may include a flange extending inwardly towards the truncated portion of the of the pleated v-shaped filter media. In some embodiments, at least one truncated scrim layer and the truncated portion of the pleated v-shaped filter media may be retained within the flange of each of the front face and the rear face.

In some embodiments, a filter apparatus with a test port member comprises a peripheral frame, a test port member, and/or a truncated filter media having an front face and an opposing rear face. In various embodiments, the test port member may include a through port extending between a front face and a rear face. In some embodiments, the test port member may include at least one flange extending at least inwardly towards the truncated filter media adjacent at least one of the front face and the rear face of the test port member. In addition, in various embodiments, the test port member may be retained by the peripheral frame and may be positioned between the peripheral frame and the truncated filter media. In some embodiments, at least one flange may exteriorly overlay at least one of a portion of the rear face and the front face of the truncated filter frame. Moreover, in some embodiments, both the truncated filter media and the test port member adjacent the truncated portion may be retained within the peripheral frame and form a rectangular filter.

In various embodiments, at least one flange may extend from the test port member adjacent the rear face of the test port member. In some embodiments, another at least one flange extends from the test port member adjacent the front face of the test port member. In various embodiments, the filter apparatus may comprise one or more truncated scrim layers retained within the peripheral frame and the test port member. In some embodiments, at least one flange may exteriorly overlay a truncated portion of the one or more truncated scrim layers. In addition, in various embodiments, the test port member includes an end wall recessed from a downstream side of the peripheral frame. In some embodiments, the end wall may define the through port. In some embodiments, the end wall of the test port member may be recessed from an upstream side of the peripheral frame.

Other embodiments may include a method of manufacturing a filter apparatus comprising the steps of providing an outer peripheral frame at least partially defining an through opening of the filter apparatus. In some embodiments, the method may include providing a test port member having a through port. In various embodiments, the method may include providing a truncated filter media. In addition, in some embodiments, the method may include attaching the test port member adjacent a truncated portion of the truncated filter media with the outer peripheral frame.

In addition, in various embodiments, the method may include the filter apparatus having a cavity defined by at least one of the test port member and the outer peripheral frame. In some embodiments, the method may include inserting one or more fill members into the cavity to define at least a portion of the through port. Moreover, in some embodiments, the method may include one or more fill members that may be an adhesive inserted into the cavity. In various embodiments, the method may include positioning a conduit member within the cavity to define at least a portion of the through port before the step of inserting the adhesive. In some embodiments, the method may include inserting a truncated scrim layer on at least one of a rear face of the truncated filter media and a front face of the truncated filter media. In various embodiments, the method may include the truncated scrim layer being on the rear face of the truncated filter media. Moreover, in various embodiments, the method may include the truncated scrim layer and the truncated filter media positioned between opposing flanges of the test port member. In some embodiments, the method may include inserting a plug into the through port of the test port member. In addition, in various embodiments, the method may have a downstream side of the filter apparatus having a cavity defined by at least one of the test port member and the outer peripheral frame wherein the plug may be recessed at least partially with the cavity.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein. These and other advantages and features, which characterize the multiple embodiments, are set forth in the claims annexed hereto and form a further part hereof. However, for a better understanding of the embodiments, and of the advantages and objectives attained through its use, reference should be made to the drawings and to the accompanying descriptive matter, in which there are described example embodiments.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
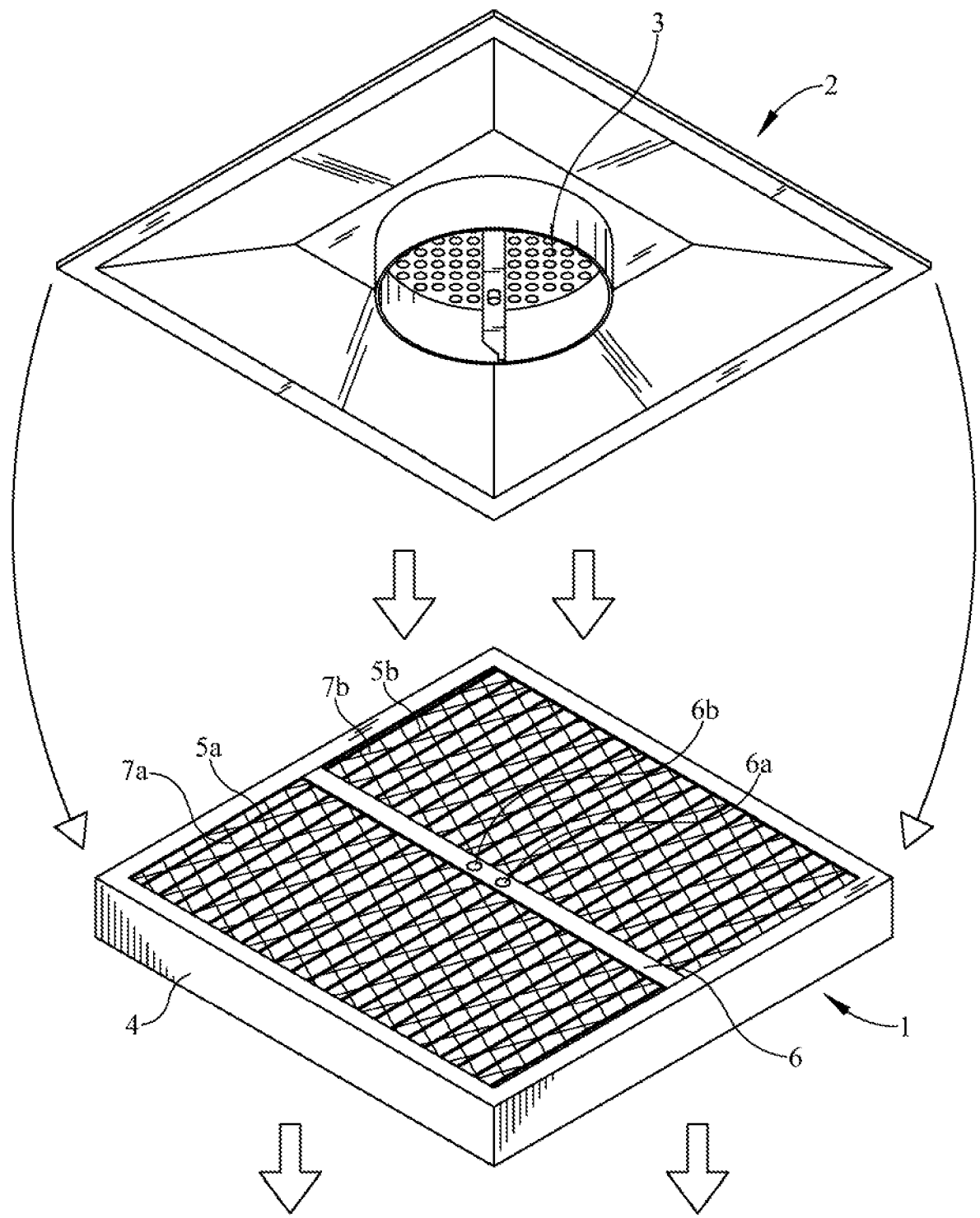
FIG. 1 is a perspective view of a filter apparatus with a centerboard of the prior art exploded from an embodiment of a hood or air handling unit.
Figure 2:
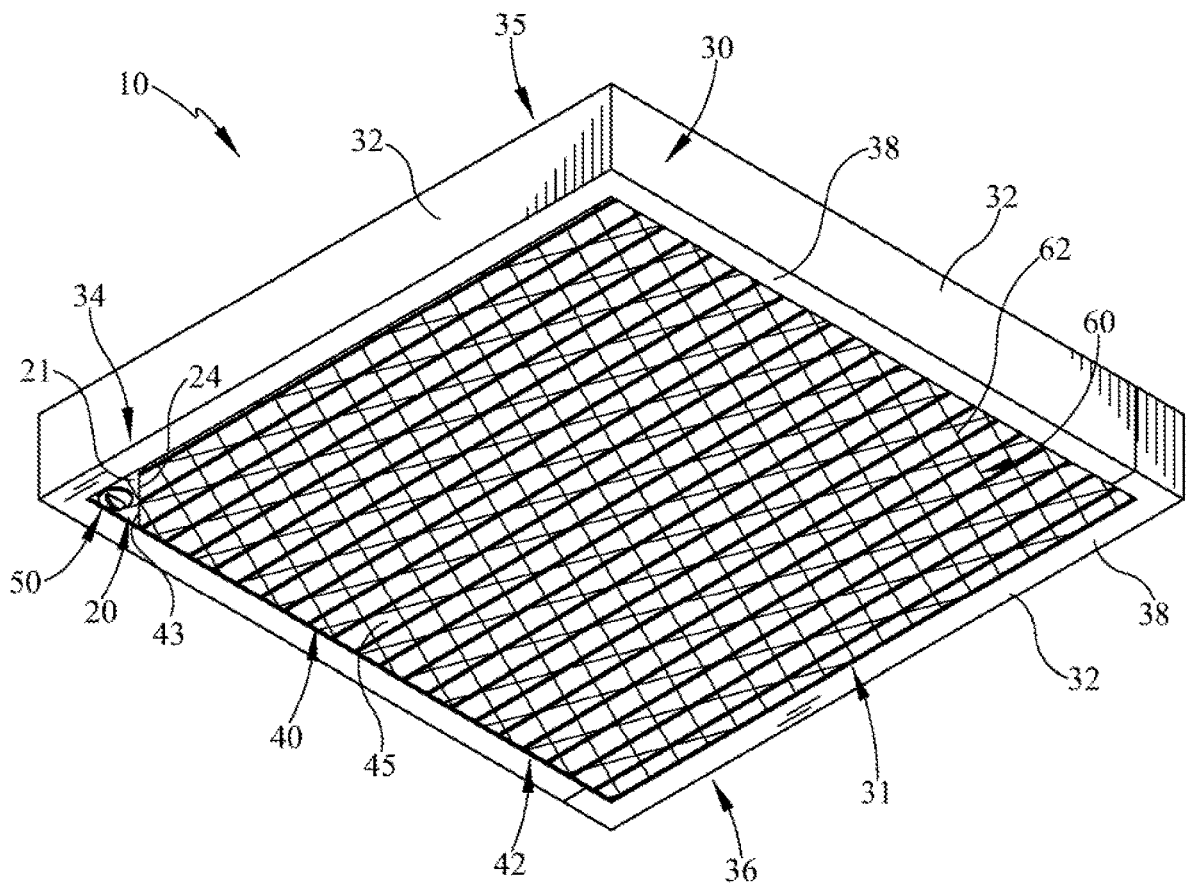
FIG. 2 is a perspective view of one embodiment of a filter apparatus.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques for a filter apparatus 10, such as the type that may be used in a clean room environment such as, but is not limited to, surgical rooms, manufacturing facilities (e.g. pharmaceuticals, electronics, etc.) or in other similar applications to control the environmental conditions within the desired area. However, it will be appreciated that the herein-described apparatus and techniques may also be used in connection with other types of filter systems in some embodiments. For example, the herein-described apparatus and techniques may be used in residential, commercial, and/or agricultural applications in some embodiments. Moreover, the herein-described apparatus and techniques may be used in connection with a variety of filter configurations and/or characteristics. Implementation of the herein-described apparatus and techniques within a variety of applications would be well within the abilities of one of ordinary skill in the art having the benefit of the instant disclosure, so the invention is not limited to the clean room implementation discussed herein.

Turning now to the drawings, wherein like numbers denote like parts throughout the several views, FIGS. 2-5 illustrate an example test port member 20 in which the various technologies and techniques described herein may be implemented. At least one test port member 20 may be positioned within one embodiment of the filter apparatus 10. The test port member 20 is positioned along the inside surface of an outer peripheral frame 30 of the filter apparatus 10 and adjacent the filter media/pack 40 (e.g. continuous or single) or filter outer periphery 41. As such, a through opening 31 defined by the filter frame is filled or covered by the test port member 20 and the remaining portion of the through opening 31 is filled or covered by the filter media 40 thereby providing a substantially uninterrupted or uniform airflow through the filter apparatus 10 and/or filter media 40. As alternatively stated the filter media 40 is not divided into multiple filtering areas, or more specifically may not be divided by the test port member 20. Although the test port member 20 of the explanatory embodiment is depicted as being substantially triangular in shape, a variety of other shapes and sizes are contemplated and may be substituted or used in addition to the various depictions. For example, a rectangular or arcuate shape may be used or multiple test port members of different or similar shape may be implemented in the same filter housing and frame. In a some embodiments, the test port member 20 may be aluminum. The test port member may be extruded and/or have a hollow profile in some embodiments. However, a variety of one or more suitable materials may be used. For example, many forms and types of plastic, cardboard or other cellulosic based material, other metal based forms and/or combinations of these options. It should be understood that the test port member 20 may be a variety of constructions, materials, quantities, shapes, sizes, and positions within the filter apparatus and still be within the scope of the description contained herein.

Figure 6:
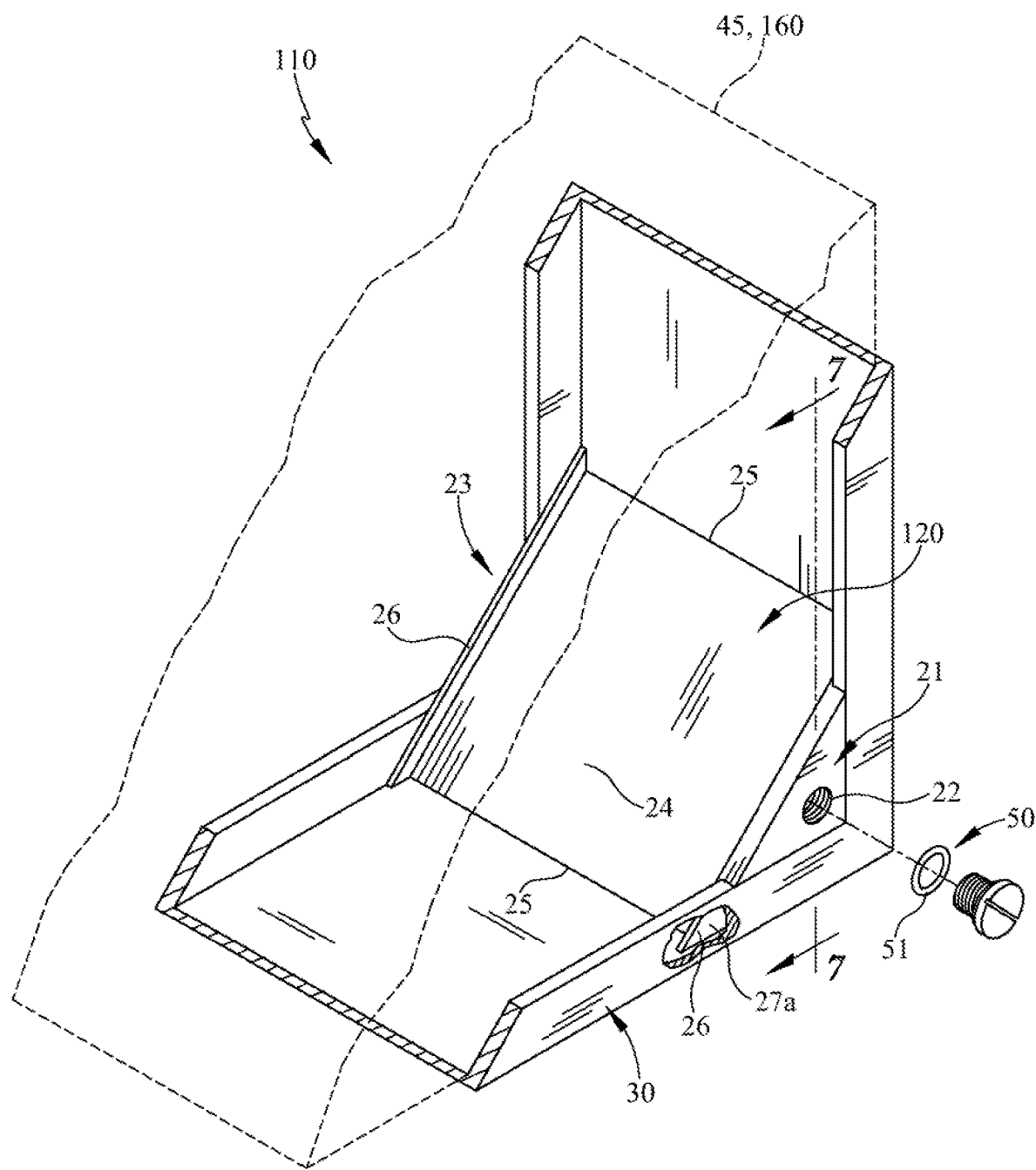
FIG. 6 is a perspective view of a portion of a filter apparatus with a test port member illustrating the plug exploded therefrom and the filter media and scrim layer, if used, shown in broken lines.
Figure 7:
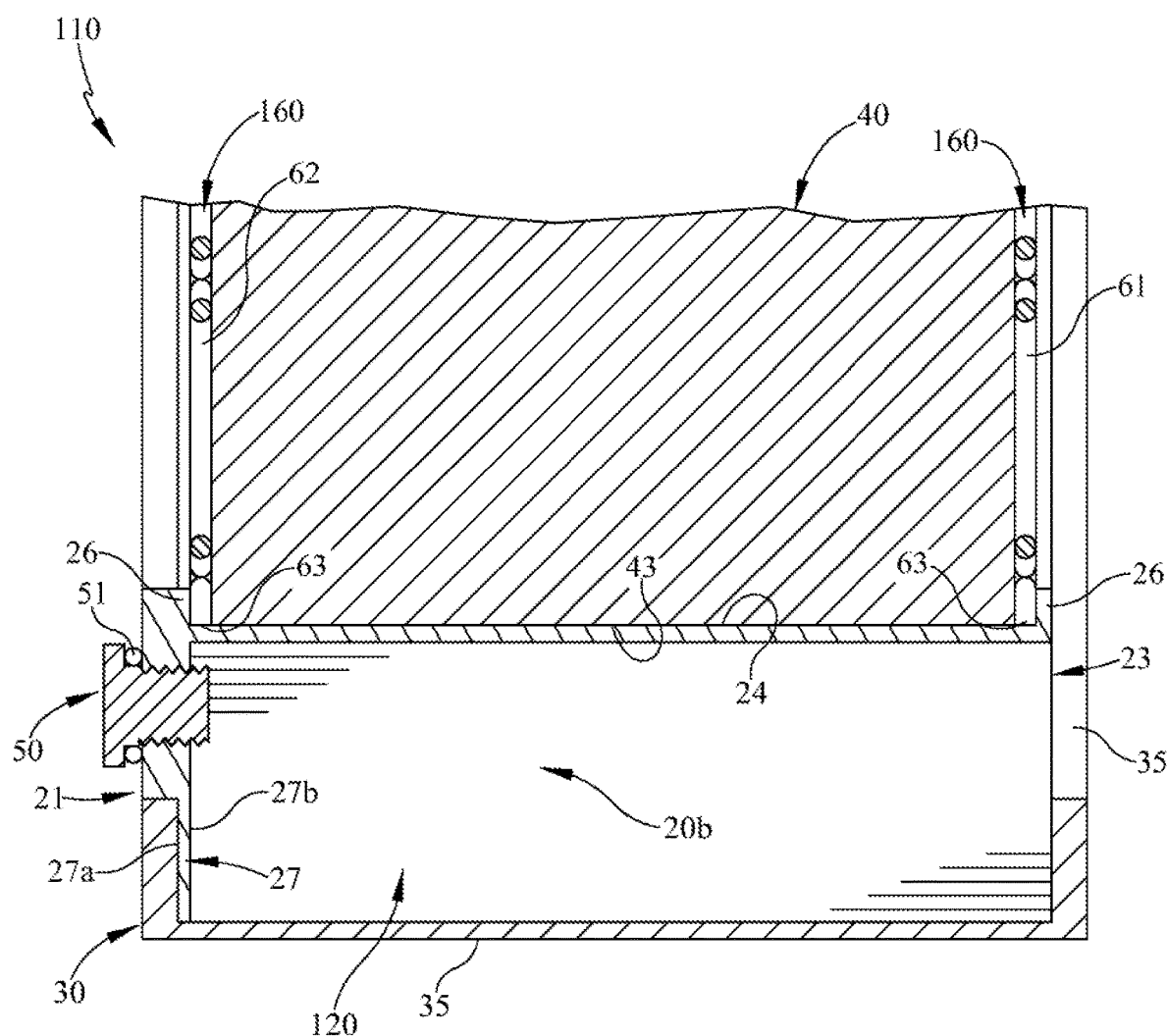
FIG. 7 is a sectional view taken along line 7-7 of FIG. 6.
Figure 9:
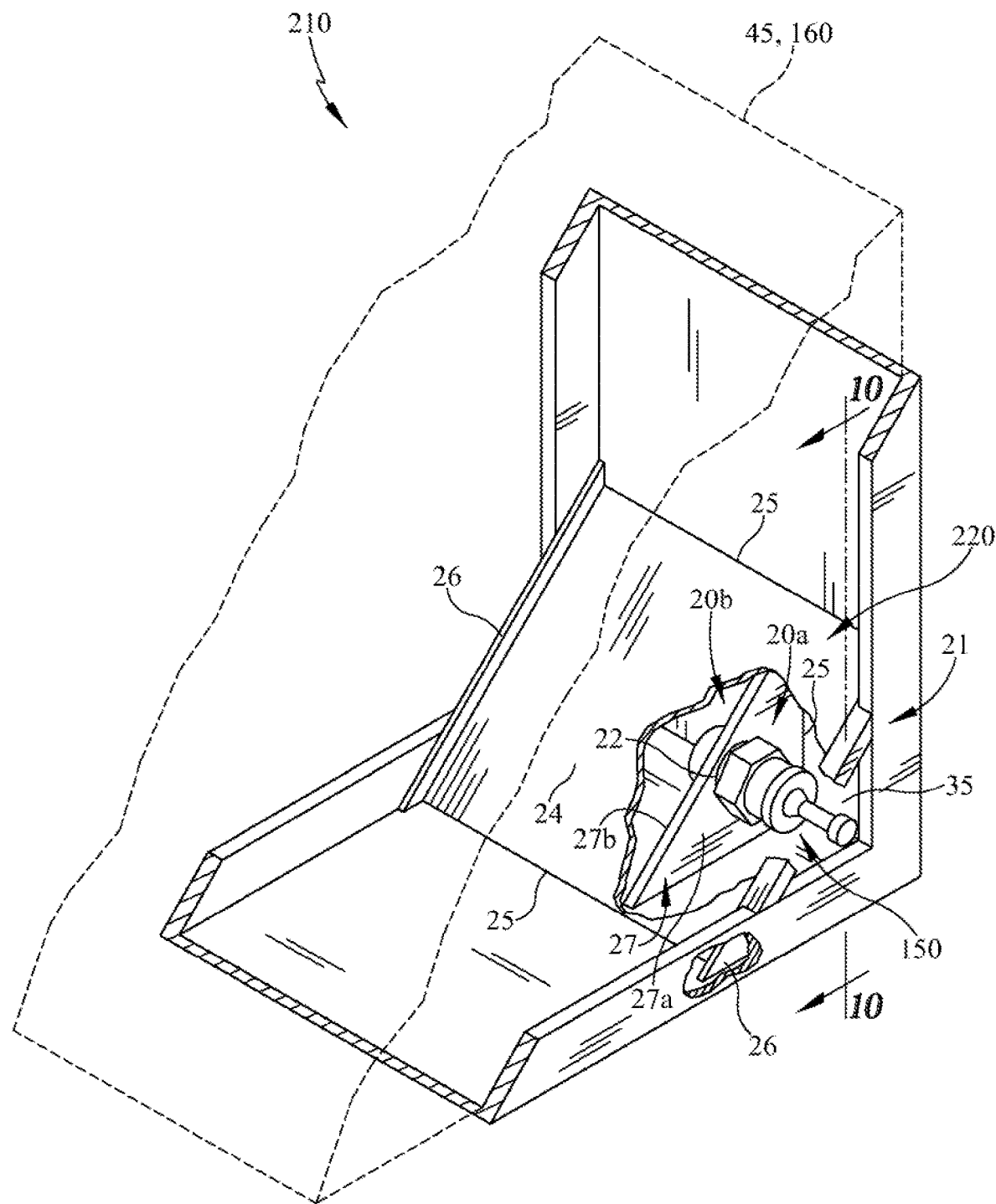
FIG. 9 is a perspective view of a portion of a filter apparatus with another embodiment of the test port member illustrating the filter media and scrim layer, if used, shown in broken lines.
Figure 10:
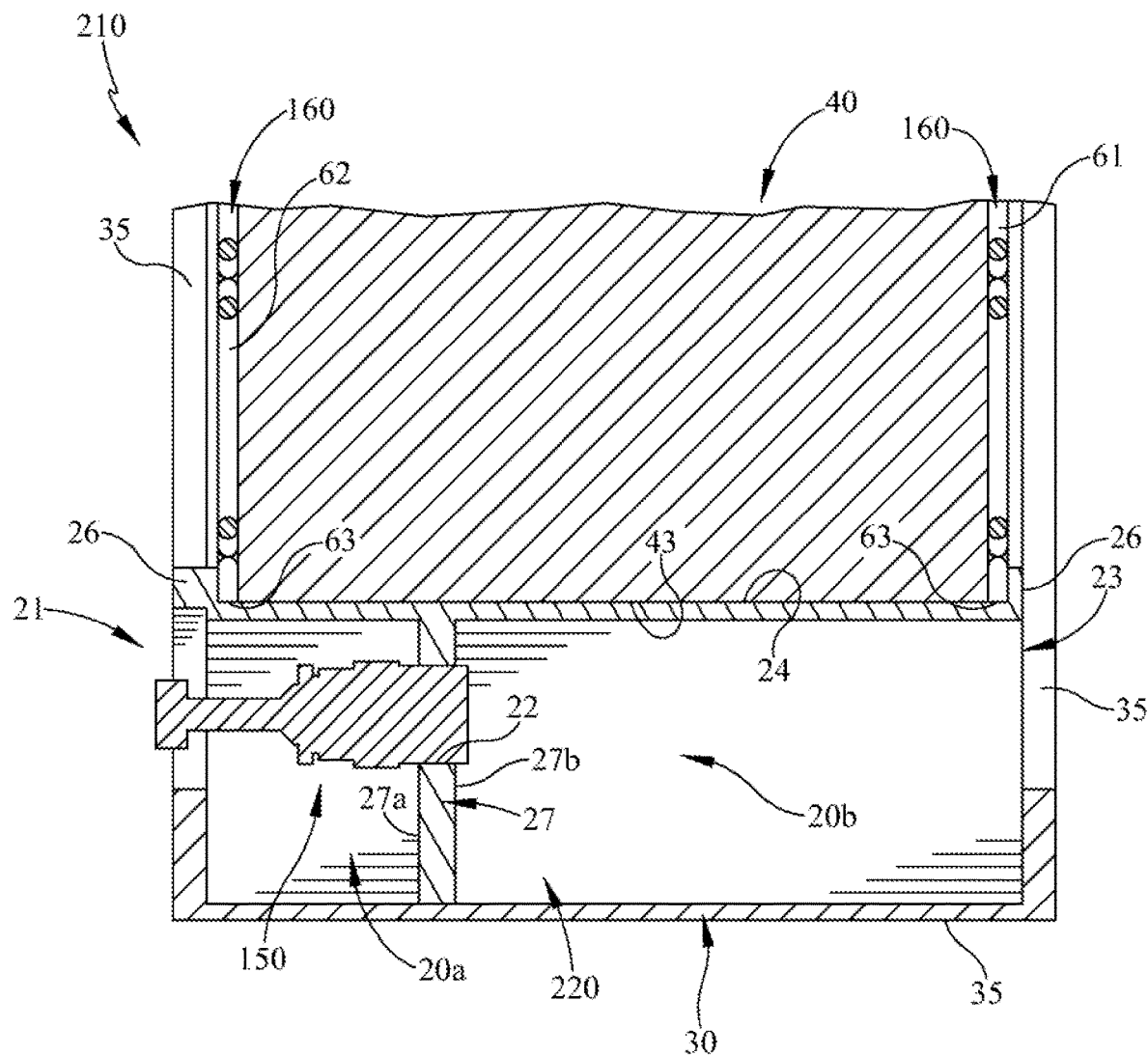
FIG. 10 is a sectional view taken along line 10-10 of FIG. 9.

As illustrated, the test port member 20 of the example depicted in FIG. 1 includes one or more through ports or test ports 22 to test the filter efficiency or other characteristic of the filter periodically. The through port 22 may extend through from a rear or downstream face 21 to the front or upstream face 23. As shown, the test port member 20, the rear face 21, and/or front face 23 may be substantially triangular in shape. The through port 22 may receive a plug 50 therein. The plug 50 may be releasably engaged to the through port 22 to gain accessibility through the filter apparatus 10 through the test port opening from the rear face 21 of the test port member 20 when one or more characteristics of the filter apparatus may need to be tested. For example, an aerosol challenge may be sampled on the upstream side of the filter apparatus 10 from the clean room side. In the embodiment shown, the through port 22 may be threaded and correspondingly the plug 50 may be threaded to releasably engage each other. In some embodiments, the plug may include a circumferential flange 52 at a proximal end thereof. The flange may have a diameter and of shape larger than the through port 22 of the test port member 20. The flange 52, if used, when adjacent the rear face 21 or side of the test port member 20 may advantageously, in some embodiments, cover and/or seal the through port 22. Moreover, in some embodiments, the plug may include a tab or other projection/recess 54 (e.g. thumb screw) to assist manual removal/insertion without tools. The test port member may include a seal along with the plug to sealingly engage the through port or portions thereof. In the embodiment shown in FIGS. 6 and 13, the plug 50 may include a seal or O-ring 51, if used. As shown in one embodiment in FIGS. 9 and 12, a plug 150 may be a plunger or pneumatic port used as an injection point of aerosol during periodic leak testing of filter on site in a variety of applications. In some embodiments, at least a portion of the plunger or pneumatic port may be dismounted or releasably removed to allow for the pressure drop to be measured (e.g. to measure how much the filter is being consumed). In some embodiments, plug 150 may include an O-ring or seal.

The test port member 20 may be received by a variety of outer peripheral frames 30 of the filter apparatus. The outer peripheral frame 30 may include one or more frame members 32 assembled together. The one or more frame members 32 define the through opening 31 therein. The test port member 20 is adjacent the outer periphery of the through opening 31. The test port member 20 may be described as not splitting the through opening 31 of the outer peripheral frame 30. Moreover, the test port member 20 is adjacent the outer peripheral frame 30. A portion or inwardly facing sides 24 of the test port member 20 engages or is adjacent to the outer periphery 41 of the filter media 40 and the remaining portion or outwardly facing sides 25 of the test port member 20 engages or is adjacent to the outer peripheral frame 30. Substantially the entire remaining portion of the outer periphery of the test port member 20 engages one or more portions of the outer peripheral frame 30. In the embodiment shown, the one or more frame members 32 create an inside corner 34 of the outer peripheral frame 30. The inside corner 34 or two adjacent sides receive and engage the test port member 20 (e.g. the outwardly facing sides 25). The sides of one or two frame members 32 may define the corner 34 and each of the nonparallel sides engage the sides or outwardly facing surfaces 25 of the test port member 20. The inside corner 34 may be at angles other than 90 degrees. In some embodiments, the test port member 20 may engage or be adjacent to one side of the outer peripheral frame 30. In the one embodiment shown in the Figures, the outer peripheral frame 30 may be a U-shaped frame member 35 combined with another frame member 36 to define the through opening 31. The test port member 20 may be received within or attach to the U-shaped frame member. The u-shaped frame member 35 may include, in some embodiments, a center frame member 35*a* and a lateral frame member 35*b* and 35*c* projecting from each end of the center frame member 35*a*. In some embodiments as shown, one or more frame members 32 may include upstream flanges 37 and/or downstream flanges 38. It should be understood that the outer peripheral frame may be a variety of constructions, materials, quantities, shapes, and sizes and still be within the scope of the invention.

Embodiments of the test port member 20 may be included with a filter media or pack 40 having a variety of characteristics. As shown in the Figures, the embodiment of the air filter media 40 is shown herein for ease of understanding. For example, the test port member 20 may be combined with a variety of filter media to create a variety of air filters. The filter apparatus 10 removes contaminants such as dirt, dust, moisture, salt, carbon, viruses, and/or other contaminants from the air flowing therethrough that may tend to harm the desired environment. Moreover, the filter media/pack or elements 40 may include a pre-filter and a final filter in some embodiments. The filter media 40 may be any suitable type, shape, material, construction, or size. As shown in the embodiment, the filter media 40 may be pleated. The filter media 40 may be a HEPA filter in some embodiments. The filter media 40 may be a variety of materials and/or layers. As shown more clearly in FIG. 5, the filter media 40 may be truncated. The filter media includes a truncated portion 43 and commensurate edge 42, side, or corner or the outer periphery 41 being a verity of shapes. A truncated corner or edge 43 engages or receives the test port member 20. The truncated edge 43 of the filter media may engage or be adjacent to the test port member 20, outer periphery, or inwardly facing side 24 of the test port member. The portion 44 (shown in broken lines in FIG. 5) removed or cut from the filter media 40 may be a variety of shapes to receive or correspond to the size and/or shape of the test port member.

Figure 3:
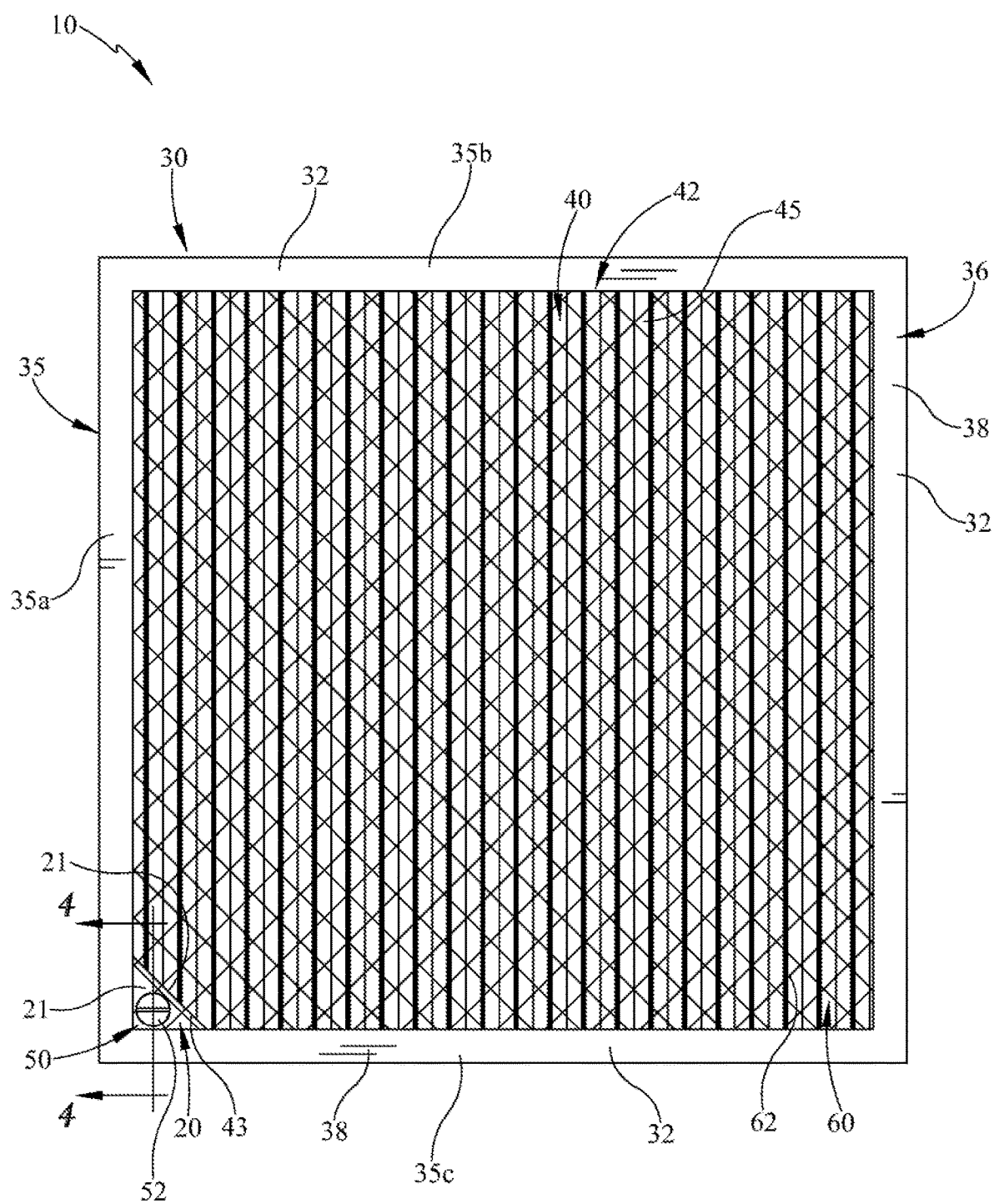
FIG. 3 is a rear view of the filter apparatus of FIG. 2.
Figure 4:
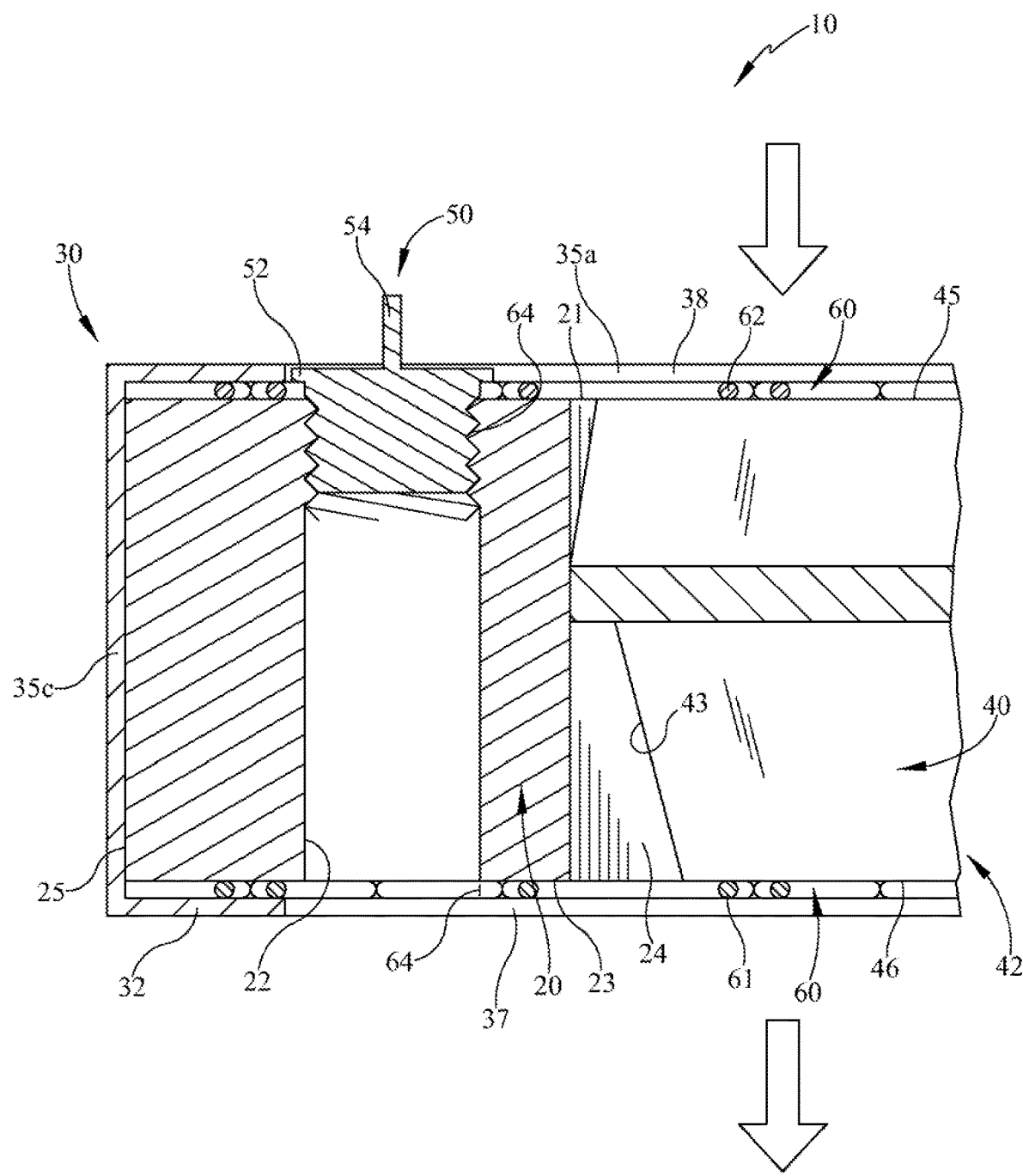
FIG. 4 is a sectional view taken along line 4-4 of FIG. 3.
Figure 5:
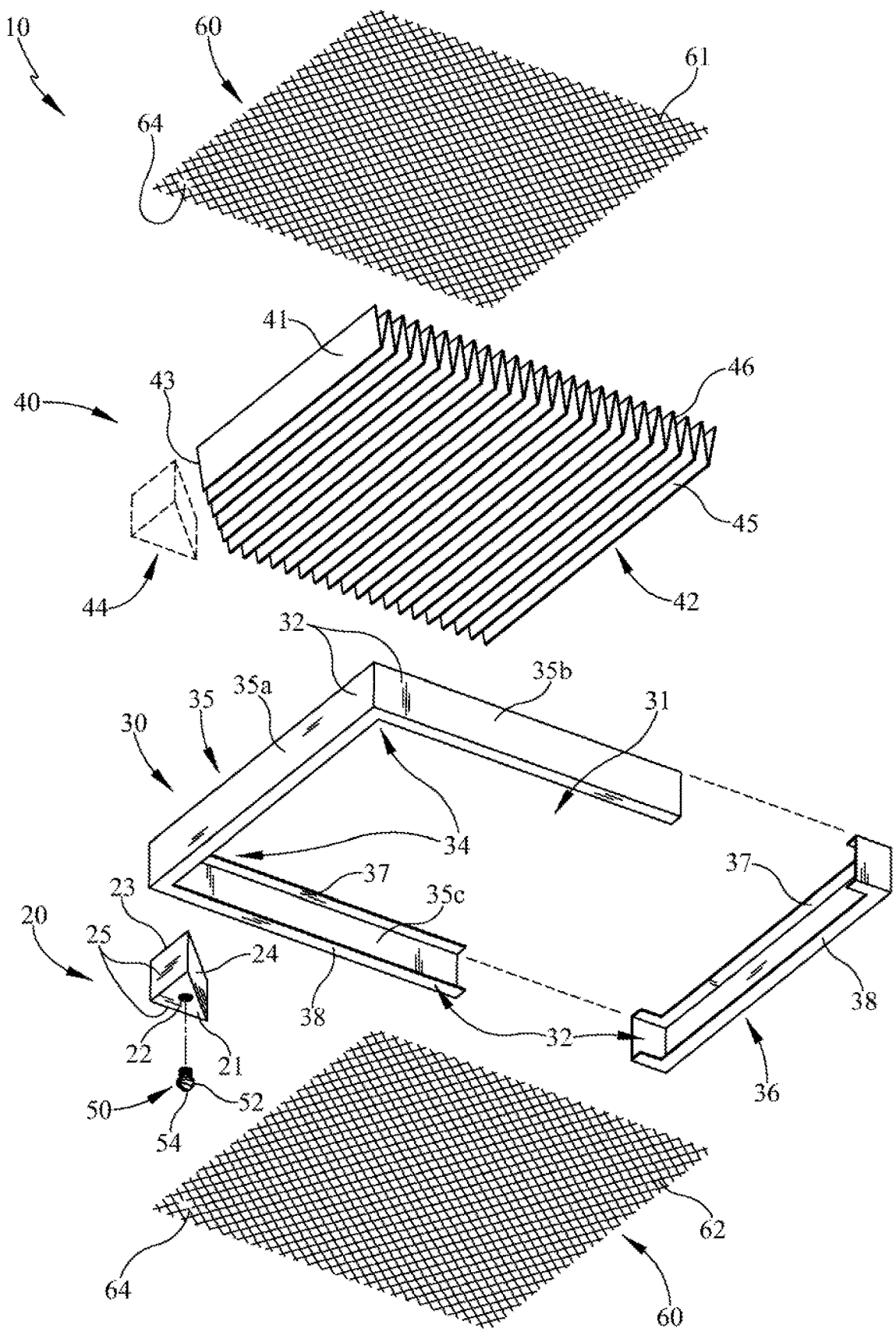
FIG. 5 is an exploded view of the filter apparatus of FIG. 2.

As shown in FIGS. 3 and 4, the test port member 20 and the filter media 40 are in substantially in the same plane when assembled. The rear face 21 of test port member 20 may be adjacent to and may be parallel to a rear face 45 of the filter media. Similarly, the front face 23 of the test port member 20 may be adjacent to and may be parallel to the front face 46 of the filter media 40.

In some embodiments, the filter apparatus 10 may include one or more scrim, mesh, expanded metal, or perforated sheet 60. The outer peripheral frame 30 may receive the one or more scrim layers 60. The scrim 60 may be a powder coated aluminum. However, a variety of materials are contemplated. If used, the scrim layer 60 may be positioned on the upstream and/or downstream side of the filter apparatus 10. In the one embodiment shown in the Figures, the scrim layer 60 is positioned on both the upstream side and downstream side. An upstream scrim layer 61 may be positioned across the front face 23, 46 of each one of the test port member 20 and the filter media 40. A downstream scrim layer 62 may be positioned across the rear face 21, 45 of each one of the test port member 20 and the filter media 40. It should be understood, in some embodiments, the scrim layer 60 may be positioned only over a truncated portion 42 of the filter media 40. If a scrim layer 60 is used on the downstream and/or upstream side of the filter apparatus 10, an opening 64 may extend through the scrim layer 61, 62 and may be coaxial with the through port 22 of the test port member 20 when assembled. One or more scrim openings 64 may receive a portion of the plug 50 when assembled or inserted into the through port 22 of the test port member 20. The flange 52 of the plug 50 may cover up the surrounding scrim material 62, if used, defining the scrim opening 64. It should be understood that the scrim 60 may be a variety of constructions, materials, quantities, shapes, and sizes and still be within the scope of the invention.

In some embodiments, the filter apparatus 10 may be combined with an upstream diffuser 3. A housing 2 containing the diffuser 3 may receive the filter apparatus 10. In some embodiments, the diffuser 3 may be in a preset or predetermined configuration and therefore may not be adjustable when the filter apparatus is received/assembled. However, the diffuser may be adjustable when the filter apparatus is assembled with the housing in some embodiments.

In use, the filter apparatus 10 may be manufactured in a variety of methods and materials. In one embodiment, a portion of one or more frame members 32 of the outer peripheral frame 30 may partially define the through opening 31 of the filter apparatus 10. In some embodiments, the portion of the outer peripheral frame may constructed in the U-shaped portion 35. The U-shaped portion 35 may include the center frame member 35*a* and lateral frame members 35*b* and 35*c* extending from each end of the center frame member 35*a*. One or more frame members 32 of the outer peripheral frame may receive or be attached to the test port member, media filter, and/or scrim. One or more of the test port member, media, and scrim may be attached alone or preassembled with each before attaching to the frame members. An adhesive (e.g. polyurethane), if used, may be used to secure one or more structures, sides, portions of the filter apparatus together. The remaining portion or frame member 36 of the outer peripheral frame may be secured to enclose the media filter, one or more scrim (if used), and test port member to define the through opening. In various embodiments, the outer peripheral frame member may be a single piece construction. In some embodiments, the test port member 20 may be attached to the one of the lateral frame members 35b, 35c and the center frame member 35a of the U-shaped portion 35 of the outer peripheral frame 30. In various embodiments, the filter media 40 may be provided in a pre-cut shape (e.g. rectangle) before a portion 44 is removed to create a remaining truncated portion 43 of the filter media 40. The portion 44 may be cut from the remaining truncated portion 43 of the filter media 40 in a shape to match the one or more contact, inwardly facing surfaces 24, or outer periphery surfaces of the test port member 20. In the embodiment shown, the corner 43 of the filter media 40 is cut at about a 45 degree. The test port member 20 may be described as filling the void left when the portion 44 of the filter media is removed. If used, the one or more scrim 60 may be inserted on the upstream and/or downstream sides of the filter apparatus 10. In one embodiment, the scrim 60 may be inserted across the rear face 21, 45 of each of the test port member 20 and the truncated portion 43 of the filter media 40 and/or across the front face 23, 46 of each of the test port member 20 and the truncated portion 43 of the filter media 40. In the embodiment shown, the scrim 60 is positioned on the rear faces 21, 45 and front faces 23, 46 of the test port member 20 and the truncated filter media 43. In some embodiments, a plug 50 may be inserted into the through port 22 of the test port member 20 and scrim 60, if used.

In some implementations, the test port member may include one or more flanges. In some embodiments, as shown in FIGS. 6-14, the test port member 120, 220 may include one or more flanges 26 overlying the truncated filter media 40 and/or scrim layer 160. The flange 26 may be positioned adjacent the rear face 21 and/or front face 23 of the test port member. The one or more flanges 26 may extend across a portion of the front face 46 and/or rear face 45 of the filter media 40. In some embodiments, the one or more flanges 26 may extend across a portion of the front face and/or rear face of the scrim layer 160. In some embodiments as shown, opposing flanges 26 receive the filter media(s) and one or more scrim layers. In various embodiments, one or more flanges on a single side of the filter media and/or scrim may be used. The flange(s) 26 of the test port member may extend within the peripheral frame 30. At least one flange 26 may extend from the inwardly facing side or portion 24 of the test port member 120, 220 inwardly towards the truncated filter media 40. The flange may extend from the frame member 32 to another adjacent frame member 32 (e.g. across a corner of the peripheral frame or perpendicular frame members). In the one embodiment shown in FIGS. 1 and 10, the opposed flanges 26 are adjacent the upstream flange 37 and downstream flange 38 of the peripheral frame 30. The one or more flanges 26 may conceal the truncated edge of the filter media layer(s) 40, scrim layers(s) 160, and/or adhesive applied to one or more surfaces of the test port member (e.g. interiorly facing surfaces of the inwardly facing side, flanges), frame, or filter apparatus portions thereof.

In some embodiments, the test port member may include a portion of the test port member recessed from the rear/front face of one or more of the filter frame/apparatus, filter media, and/or remaining portion of the rear/front face of the test port member. In various embodiments as shown in FIGS. 9-13, a recessed downstream surface 27a of a platform or end wall 27 of the test port member 120, 220 may be spaced or offset from the rear face 21 of the test port member (e.g. the rear face flange) that may be adjacent the downstream side or flange 38 and/or downstream facing surface of the filter apparatus 110, 210. The recessed end wall 27 or ledge may project from the exterior surface of the inwardly facing side 24 of the test port member. For example, the end wall 27 may extend in an opposite direction from the flange(s) 26, if used. The end wall 27 may be triangular in shape and extend for a distance for example to adjacent frame members (e.g. at the corner of the peripheral frame) or to the outwardly facing sides 25 of the test port member. The through port(s) 22 may extend through recessed end wall 27 (e.g. the downstream surface 27a). With the end wall 27 recessed, the plug 150 may be recessed as least partially within the space, first cavity 20a, region created by the recess (e.g. between the test port member and the peripheral frame). As a result, the recessed plug 150 may not extend or may partially extend downstream of the filter apparatus or portions thereof. The recessed plug 150 or portions thereof may be, but not limited to, concealed to one or more users in applications and/or reduce undesired contact or applied forces during handling and/or applications for example.

Figure 8:
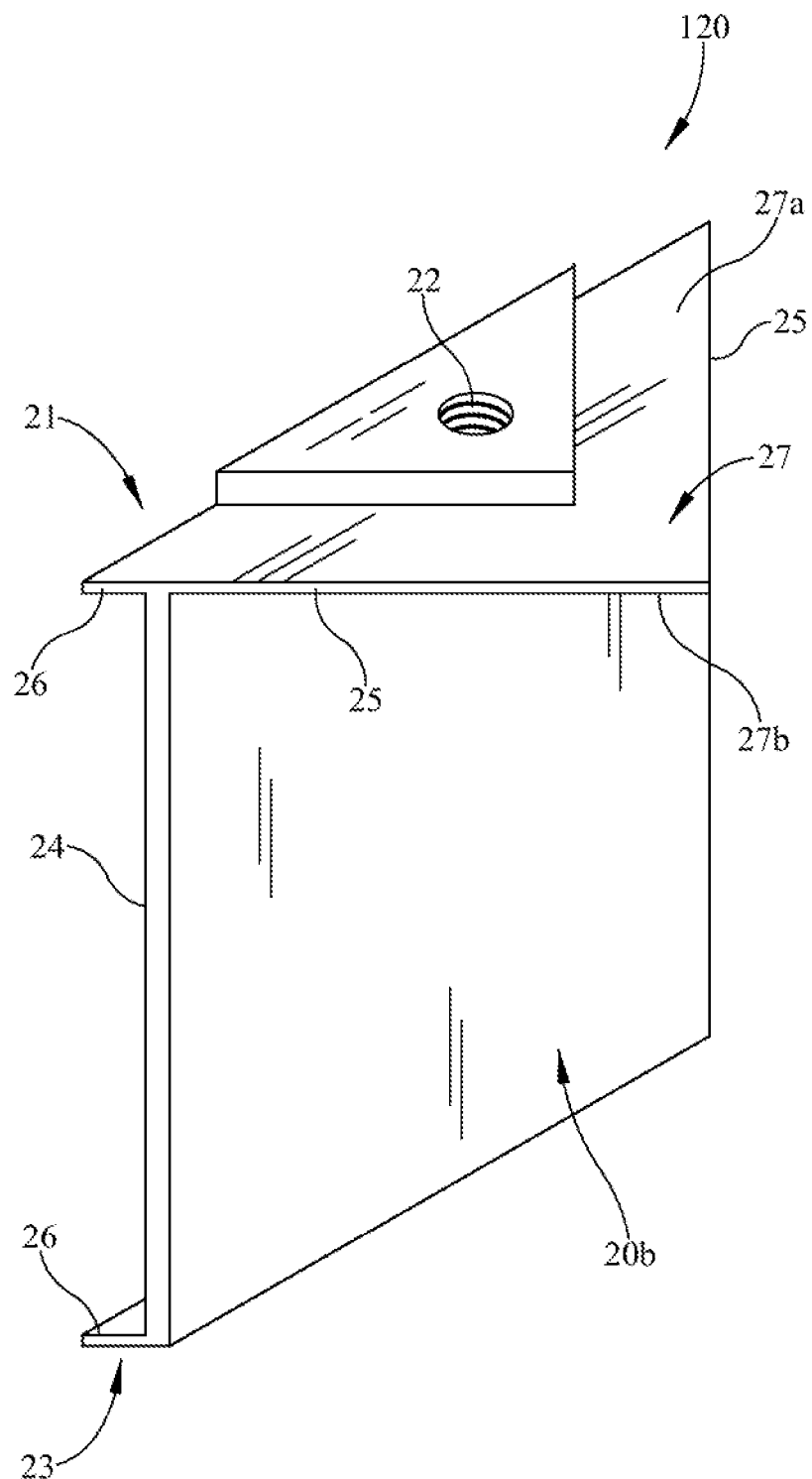
FIG. 8 is a perspective view of the test port member of FIG. 6.
Figure 11:
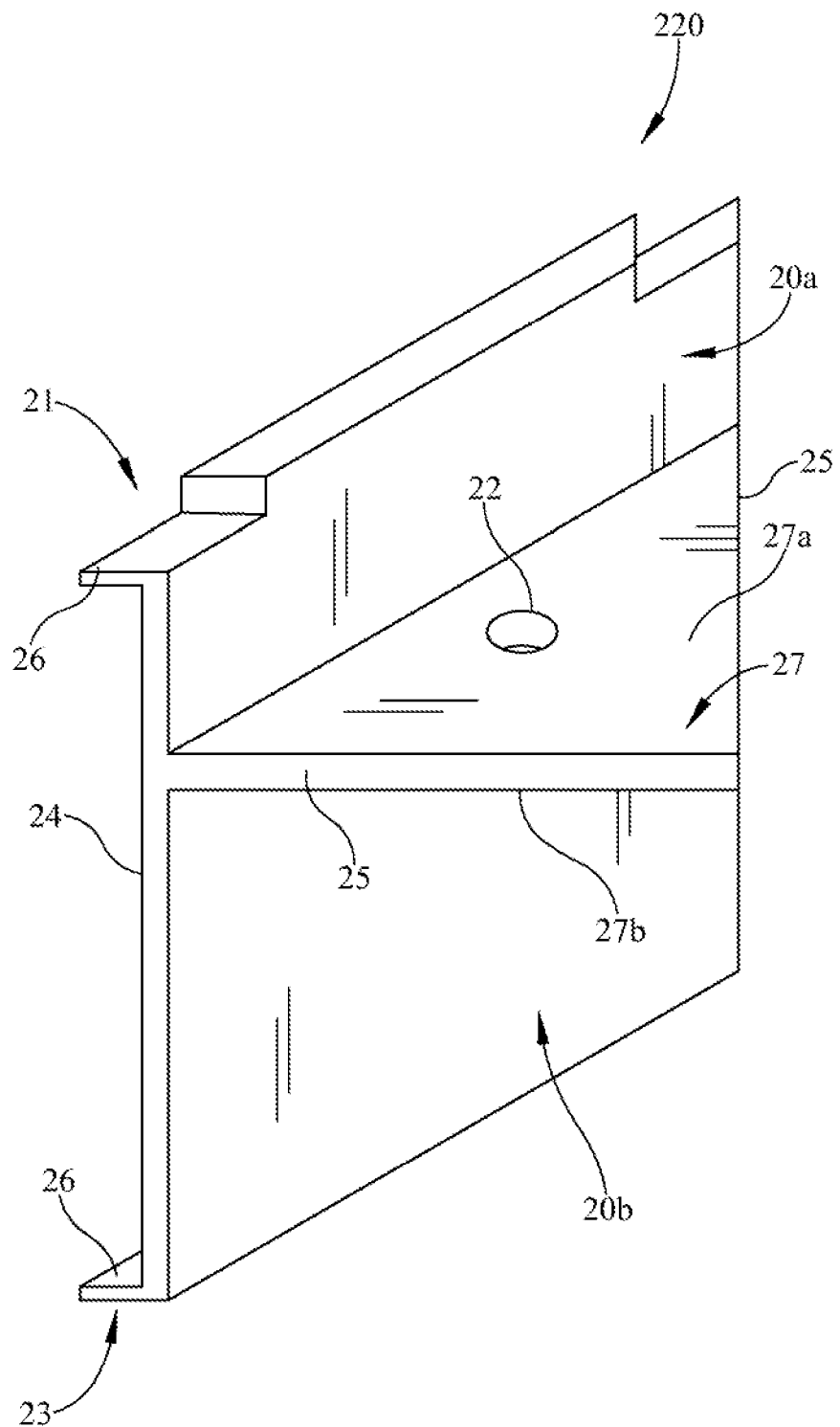
FIG. 11 is a perspective view of the test port member of FIG. 9.

In some implementations of the test port member, portions of the end wall 27 may be spaced from a remaining portion of the front face 23 of the test port member (e.g. upstream flange 37), front face of filter media, and/or upstream face of the filter apparatus or portions thereof. As shown in FIGS. 6-14, in some embodiments of the test port member, an upstream surface 27b of the end wall if recessed or spaced from the upstream or front surface 23 of the test port member may create a second cavity, region, or space 20b between the test port member/end wall and upstream surface of the filter apparatus or portions thereof. For example, the filter apparatus 220 and/or test port member may include the first cavity 20a and/or the second cavity 20b in some embodiments. In one embodiment as shown in FIG. 8, the filter apparatus 120 may include the second cavity 20b without the first cavity, therefore the upstream surface 27b is recessed from the front face of the test port member and the downstream face 27a is adjacent the downstream face of the filter apparatus. In other embodiments, as shown in FIG. 11, the filter apparatus 210 and/or test port member 220 may include both the first cavity and the second cavity. One embodiment, not shown, may include the first cavity 20a without the second cavity 20b, therefore the downstream surface of the end wall is recessed and the upstream surface of the end wall may be adjacent the upstream surface of the filter apparatus. Moreover, the recessed downstream and/or upstream surface, if used, may include the through port 22 extending therethrough and/or define a portion thereof. The end wall and/or one or more cavities may be a variety of constructions, quantities, shapes, and sizes and still be within the scope of the invention.

In various implementations, one or more truncated perforated sheets or support structure may be used within the filter apparatus. In the one embodiment shown in FIGS. 6-14, the filter apparatus 110 and 210 may include one or more truncated scrim, mesh, expanded metal, or perforated sheet 160. It should be understood that scrim layer may not be truncated in some embodiments. The outer peripheral frame 30 and/or the test port member 120, 220 may receive and retain the one or more truncated scrim layers 160. The truncated scrim layer 160 may be positioned over the truncated filter media 40. The truncated portion or corner 63 of the scrim may be positioned adjacent the test port member (e.g. inwardly facing side). As shown in more detail in FIGS. 7, 10, 13, and 14, if one or more flanges 26 of the test port member 120, 220 are used, the truncated scrim layer 160 and/or corner 63 may be positioned between the upstream/downstream flange 26 of the test port member and/or corresponding upstream/downstream flange of the peripheral frame adjacent the filter media. If used, the truncated scrim layer 160 may be positioned on the upstream and/or downstream side of the filter apparatus 110, 210. In the embodiments shown in the FIGS. 6-14, the scrim layer 160 is positioned on both the upstream side and downstream side. An upstream scrim layer 61 may be positioned across the front face 46 the filter media 40. A downstream scrim layer 62 may be positioned across the rear face 45 of the filter media 40. It should be understood that the truncated scrim 60 may be a variety of constructions, materials, quantities, shapes, and sizes and still be within the scope of the invention.

Figure 12:
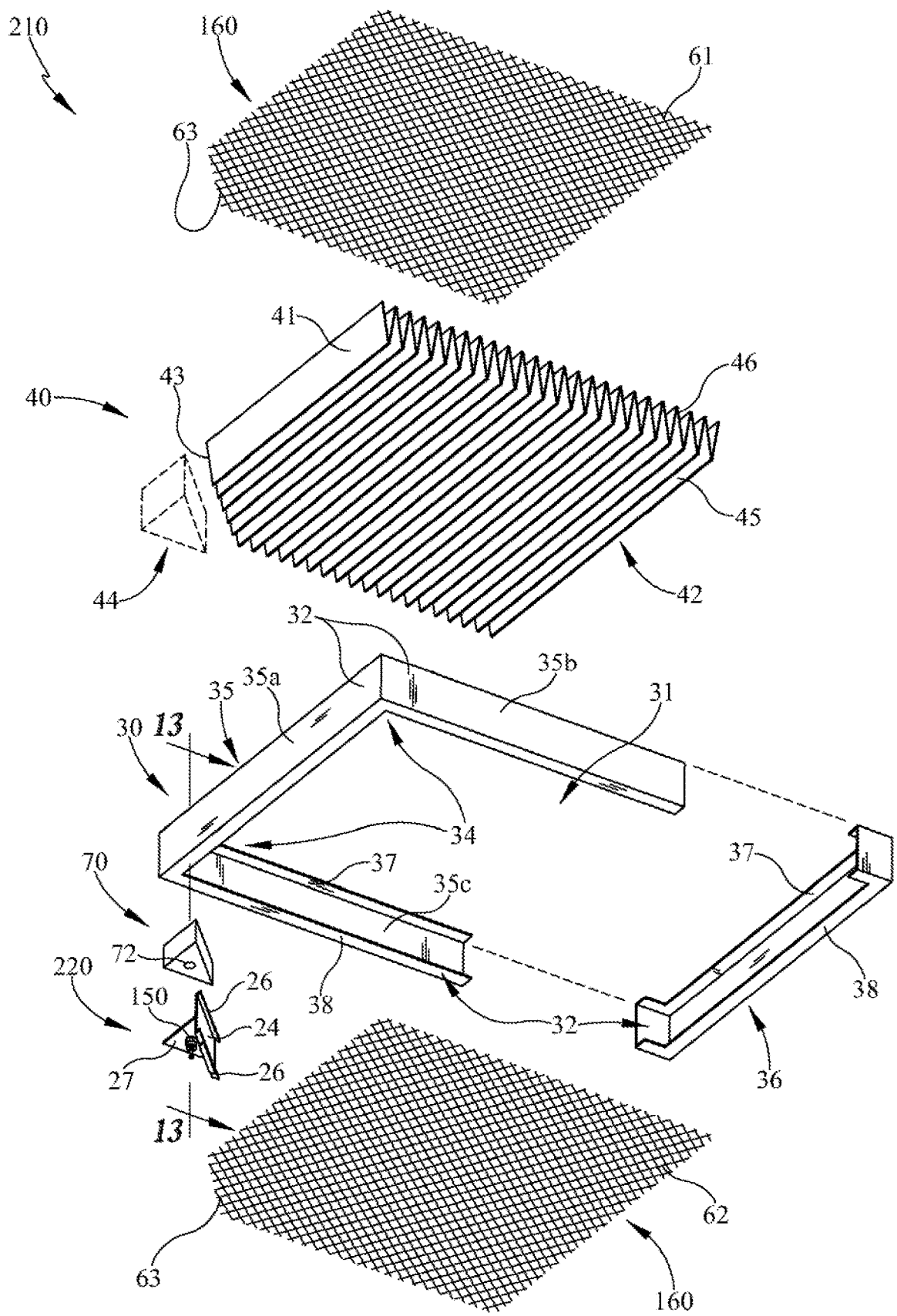
FIG. 12 is an exploded view of the filter apparatus of FIG. 9 illustrating a test port member embodiment with a fill structure.
Figure 13:
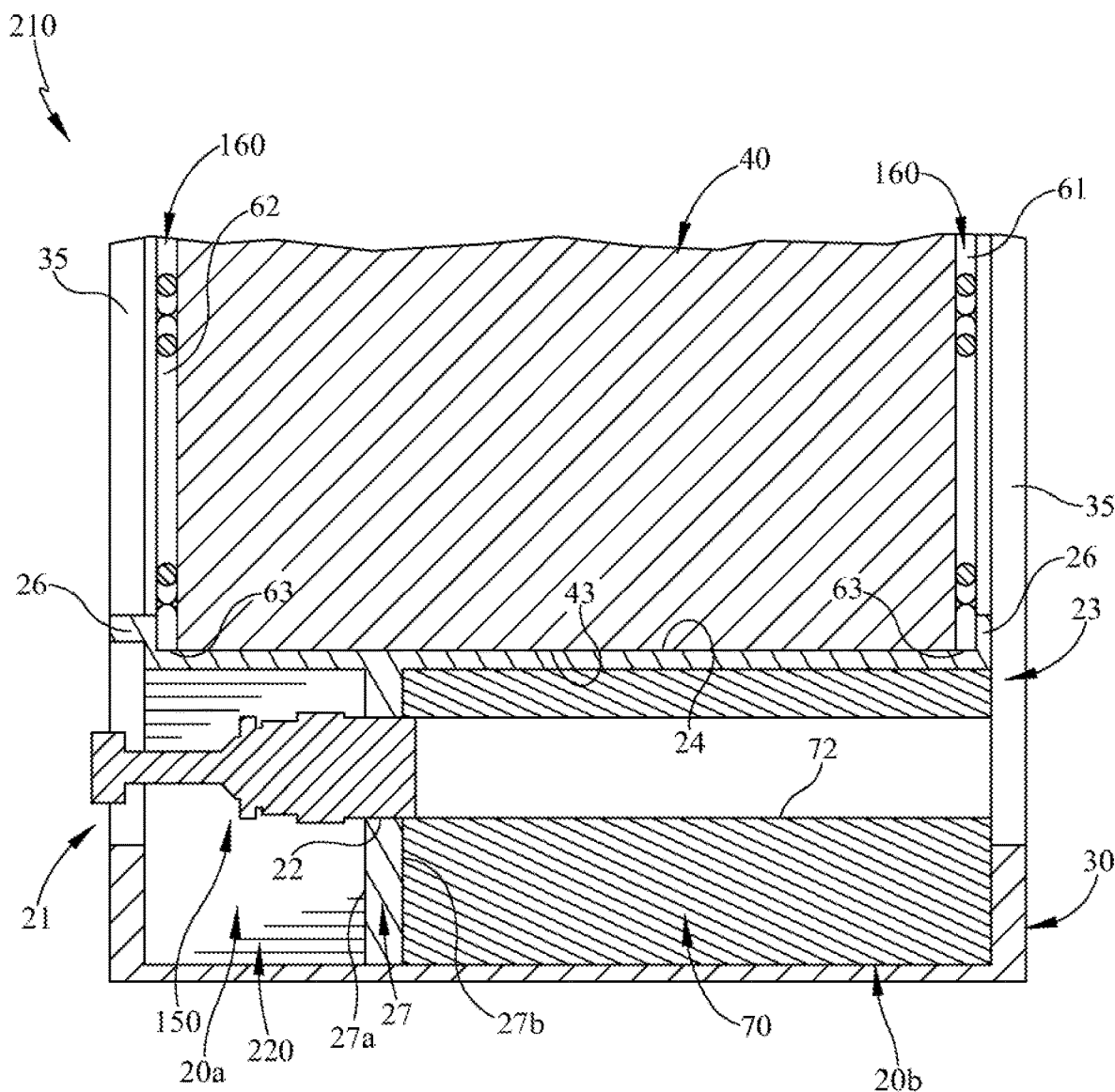
FIG. 13 is a sectional view taken along line 13-13 of FIG. 12.
Figure 14:
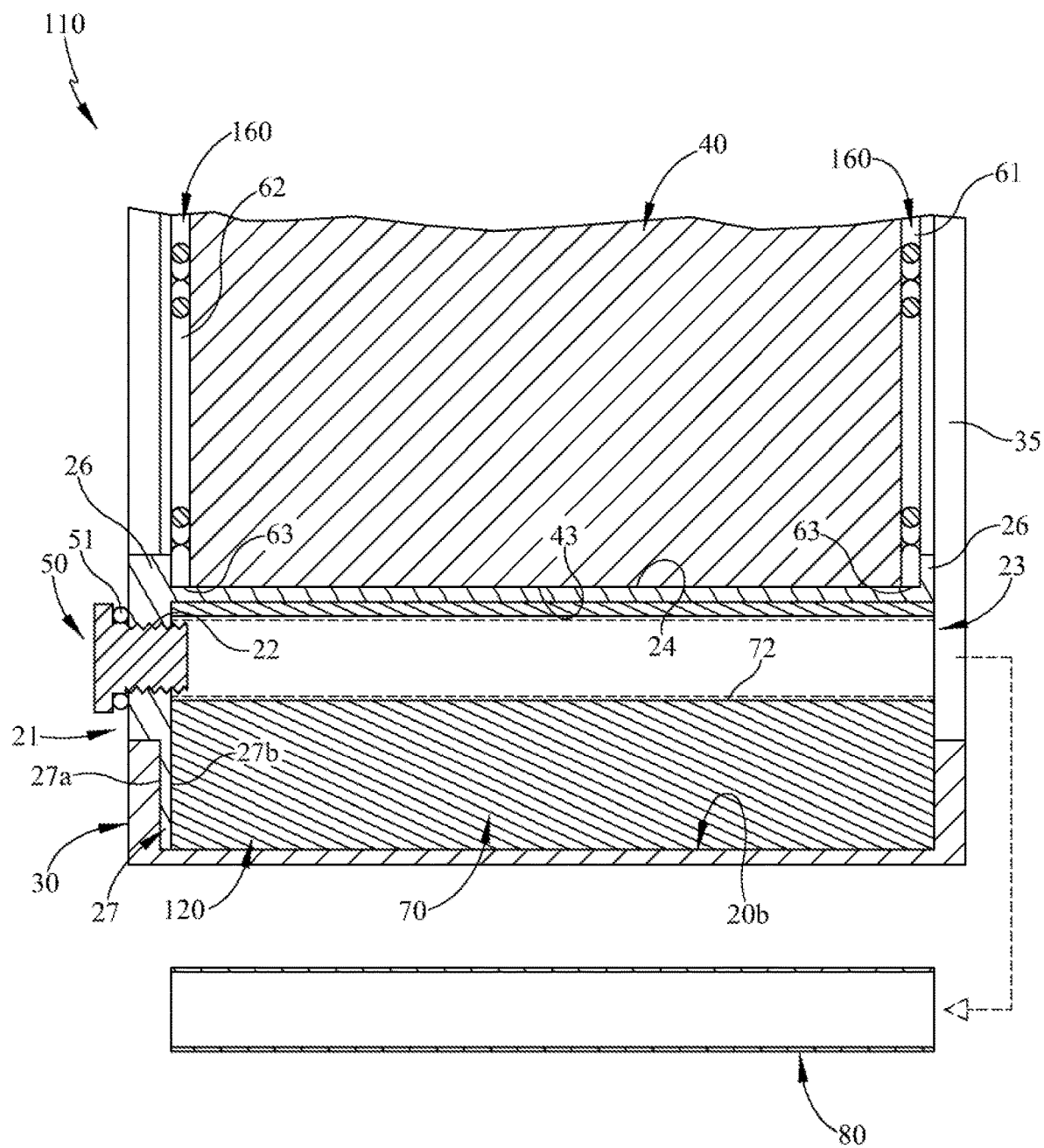
FIG. 14 is a sectional view taken along line 7-7 of FIG. 6 illustrating a fill structure and an embodiment of a conduit removed from the fill structure.

In various embodiments, the test port member may be of a two or more piece construction. As shown in FIGS. 12-14, one embodiment of the filter apparatus and/or test port member 120, 220 may include one or more fill members or structures 70 adjacent the truncated portion 43 of the truncated filter media 40 to replace the portion 44 removed from corresponding truncated filter media. In some embodiments, the fill members 70 may be positioned within the first cavity 20a and/or second cavity 20b defined by the test port member, peripheral frame, scrim and/or filter media. As shown in the one embodiment in FIGS. 12-14, the second cavity 20b may include one or more fill members 70. The fill member 70, if used, may define at least a portion of the through port 72 in some embodiments. Although, the fill member 70 is shown as a unitary piece and triangular in shape, the fill member may be a variety of constructions, materials, quantities, shapes, and sizes and still be within the scope of the invention. Moreover, the fill member 70 may be a different or second material than the remaining portion of the test port member. For example, the fill member may be an adhesive or plastic material and the remaining portion may be extruded aluminum.

In various embodiments, the through port extending through the filter apparatus in a direction from the upstream and downstream may be defined by one or more portions of the filter apparatus and/or test port member. The through port 22 may be at least partially defined by the test port member, peripheral frame, scrim, and/or portions of the filter apparatus. For example, the test port member may define a portion of the through port by the rear face, front face, end wall (e.g. downstream and/or upstream surface), fill member, first cavity, and/or second cavity or portions thereof. As more clearly shown in FIGS. 13 and 14, one embodiment of the through port 22 is defined by the end wall, one or more cavities, and fill member of the test port member.

In use, the filter apparatus 110, 210 may be manufactured in a variety of methods and using a variety of materials. In one embodiment, as shown in FIG. 12, a portion of one or more frame members 32 of the outer peripheral frame 30 may partially define the through opening 31 of the filter apparatus 210. One or more frame members 32 of the outer peripheral frame may receive or be attached to the one or more test port members 220, media filters 40, and/or scrims 160. One or more of the test port member or portions thereof (e.g. fillable member, if used), media, and/or scrim(s) may be attached alone or preassembled with each before attaching to the frame members. An adhesive (e.g. polyurethane), if used, may be used to secure one or more structures, sides, portions of the filter apparatus together. In some embodiments, the test port member 220 (e.g. end wall and/or flanges) may be attached to one or more members of the outer peripheral frame 30. The test port member 220 may be described as filling the void left when the portion 44 of the filter media and/or portion of the scrim layer is removed. In various embodiments, the filter media 40 may be provided in a pre-cut shape (e.g. rectangle) before a portion 44 is removed to create a remaining truncated portion 43 of the filter media 40. The truncated filter media 40 and scrim 160 in a shape to match the one or more contact, inwardly facing surfaces 24, or outer periphery surfaces of the test port member 220. The truncated filter media and scrim may be secured (e.g. adhesive) between one or more flanges 26 of the test port member, if used, and/or the inwardly facing surfaces/outer periphery. The truncated filter media and/or scrim may be secured (e.g. adhesive) to the peripheral frame in some embodiments. In some embodiments, the fill member 70, if used, may be inserted into the outer peripheral frame and/or one or more cavities of the test port member. The fill member may include a portion of the through port. In some embodiments, as shown in FIGS. 12 and 13, the fill member 70 may be coupled with the remaining portion of the test port member 220 before being inserted into the outer peripheral frame 30. In some embodiments, the fill member may be inserted after the remaining portion of the test port member is received by the peripheral frame. For example, in various embodiments for example as shown in FIG. 14, the fill member may be added into the second cavity 20b defined by portions of the assembled test port member (e.g. end wall and inwardly facing side) and/or peripheral frame, such as but not limited to an adhesive. Although the fill member 70 may define the through opening, in some embodiments the through opening may be subsequently added (e.g. forming, and/or removal of material). In one preferred embodiment as best shown in FIG. 14, a conduit or structure 80 may be inserted into the cavity 20b to define the space occupying the through port of the fill member. The conduit 80 may be made from aluminum or plastic in some embodiments. As such once the adhesive is added/poured into the cavity about the conduit 80, the conduit or member may be subsequently removed from the adhesive/fill member material defining a portion of the through port. Alternatively, the conduit with though opening may remain the cavity and/or fill material and define the through opening therein. It should be understood that the conduit may not include a through opening therein in some embodiments. For example the conduit or member may be a solid cylinder or object subsequently removed to open or expose the formed through opening. If used, the one or more truncated scrim 160 may be inserted on the upstream and/or downstream sides of the filter apparatus 210. In one embodiment, the scrim 60 may be inserted across the rear face 45 of the truncated portion 43 of the filter media 40 and/or across the front face 46 of the truncated portion 43 of the filter media 40 within the one or more flanges. In the embodiment shown as shown in FIG. 12, the truncated scrim 60 is positioned on the rear face 45 and front face 46 of the truncated filter media 43 with the opposing flanges. An adhesive may be used to secure the truncated scrim layer(s) to the test port member (e.g. inwardly facing sides of the flange(s), inwardly facing side wall, and/or peripheral frame). In some embodiments, a plug 50, 150 may be inserted into the through port 22 of the test port member 20 or end wall 27. In various embodiments, the plug may include an O-ring. In some embodiments, the plug may be a plunger. The plunger may not include an O-ring in some embodiments. A tool may be used to install and/or remove the plunger 150 from the end wall and/or test port member to check the change in pressure, etc.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A filter, comprising:
a pleated v-shaped filter media having a filter media front face and a filter media rear face, the pleats extending to a predefined height;
a test port member having a first through port extending between a test port front face and an opposing test port rear face of the test port member, and wherein the test port member further includes a three-sided outer periphery, wherein the three-sided outer periphery includes an inwardly facing side and two remaining sides extending between the test port front face and the opposing test port rear face;
a peripheral frame receiving the filter media and the test port member wherein the peripheral frame maintains the filter media and the test port member in an adjacent relationship;
wherein the test port member and the v-shaped filter media are retained by the peripheral frame and wherein the test port member is positioned between the peripheral frame and a truncated portion of the pleated v-shaped filter media, wherein the inwardly facing side of the test port member engages an outer periphery of the filter media and the two remaining sides of the three-sided outer periphery of the test port member engages the frame, and wherein the test port member defines one or more cavities with the peripheral frame intersected by the first through port;
the truncated portion of the pleated v-shaped filter media having a shape of a triangular truncated portion and wherein the test port member matches the triangular truncated portion of the pleated v-shaped filter media;
the test port member first through port is formed on a recessed end wall, the recessed end wall forming a first cavity and a second cavity, the first cavity and the second cavity separated by the recessed end wall, the first through port receiving a plug;
the recessed end wall positioned between an upstream side and downstream side of the filter;
wherein the test port front face includes a first flange and the test port rear face includes a second flange extending inwardly towards the truncated portion of the pleated v-shaped filter media, wherein the recessed end wall extends in an opposite direction to the first flange and the second flange away from the truncated portion of the of the pleated v-shaped filter media, wherein the recessed end wall, the first flange, and the second flange are substantially parallel to each other, wherein the first flange extends over a portion of the filter media front face and the second flange extends over a portion of the filter media rear face to retain the pleated v-shaped filter media between the first flange and the second flange;
wherein the recessed end wall retains the plug within the first cavity and wherein the second cavity extends to the upstream side of the filter;
wherein the filter is rectangular; and
wherein the test port member further comprises one or more fill members within the second cavity extending from the recessed end wall to the upstream side of the filter, wherein the one or more fill members have a second through port in fluid communication with the first through port, and wherein the second through port of the fill member extends from the first through port to the upstream side of the filter.

2. The filter of claim 1 wherein the plug is an aerosol plunger at rest in a closed position.

3. The filter of claim 1 wherein the second through port of the one or more fill members receives the plug.

4. The filter of claim 1 wherein the one or more fill members only occupies the second cavity.

5. The filter of claim 1 wherein the one or more fill members extend from an upstream surface of the recessed end wall to an upstream flange of the peripheral frame.

6. The filter of claim 1 wherein the one or more fill members is an adhesive.

7. The filter of claim 1 wherein the one or more fill members is triangular in shape.

8. A filter, comprising:
a rectangular frame having a rectangular inner periphery and surrounding a single filter media and a test port member, and wherein the rectangular frame includes a downstream flange and an upstream flange;
the filter media being a pleated v-shaped filter media having a filter media front face and a filter media rear face, the pleats extending to a predefined height;
the single filter media further having a triangular truncated portion removed at a truncated corner of the single filter media;
the test port member being a triangular shaped test port member having a first through port extending between a test port front face and an opposing test port rear face;
wherein the test port member further includes an inwardly facing side extending between the test port front face and the opposing test port rear face;
the rectangular frame receiving and retaining the single filter media and the test port member wherein the rectangular frame maintains the single filter media and the test port member in an adjacent relationship to form a rectangular outer periphery engaging the inner periphery of the rectangular frame;
wherein the test port member is positioned between the rectangular frame and the triangular truncated portion of the pleated v-shaped filter media at a corner of the rectangular frame, the inwardly facing side of the test port member engaging an outer periphery of the single filter media;
wherein the test port member matches the triangular truncated portion of the pleated v-shaped filter media;
the test port member first through port formed on a recessed end wall of the test port member, the recessed end wall forming a first cavity and a second cavity of the test port member, the first cavity and the second cavity separated by the recessed end wall wherein the second cavity extends to the filter media rear face, and wherein the recessed end wall extends away from the pleated v-shaped filter media;
the test port member having a first flange and a second flange extending in an opposite direction to the recessed end wall inwardly towards the pleated v-shaped filter media, wherein the recessed end wall, the first flange, and the second flange are substantially parallel to each other, wherein the first flange extends over a portion of the filter media front face and the second flange extends over a portion of the filter media rear face;

an adhesive on the test port member inwardly facing side to adhere the test port inwardly facing side to the truncated corner of the single filter media;

the test portion member includes a fill member within the second cavity extending from the recessed end wall to the upstream flange of the rectangular frame, wherein the fill member includes a second through port in fluid communication with the first through port, and wherein the second through port of the fill member extends from the recessed end wall to the upstream flange of the rectangular frame; and wherein the first through port of the recessed end wall and the second through port of the fill member receives a plug whereby retaining the plug within the first cavity and the second cavity.

9. The filter of claim 8 wherein the plug is an aerosol plunger at rest in a closed position.

10. The filter of claim 8 wherein the fill member is an adhesive.

11. The filter of claim 8 wherein the fill member is a triangular plastic member.

* * * * *

UNITED STATES PATENT AND TRADEMARK OFFICE
CERTIFICATE OF CORRECTION

| | |
|---|---|
| PATENT NO. | : 11,478,737 B2 |
| APPLICATION NO. | : 16/014470 |
| DATED | : October 25, 2022 |
| INVENTOR(S) | : Jorn Poulsen |

It is certified that error appears in the above-identified patent and that said Letters Patent is hereby corrected as shown below:

In the Specification

In Column 1, Line 39, after "and" delete "an".

In Column 2, Line 67, delete "the rear face of each of the rear face of each of" and insert -- the rear face of each of --, therefor.

In Column 6, Line 29, after "In" delete "a".

In the Claims

In Column 13, Claim 1, Line 60, delete "of the of the" and insert -- of the --, therefor.

Signed and Sealed this
Twentieth Day of December, 2022

*Katherine Kelly Vidal*

Katherine Kelly Vidal
*Director of the United States Patent and Trademark Office*